May 4, 1965

P. V. MILLARD 3,182,119

INSULATING GROMMETS

Filed Jan. 3, 1961

INVENTOR.
PHILLIP V. MILLARD
BY
Barnes, Kisselle, Raisch & Choate
ATTORNEYS

May 4, 1965

P. V. MILLARD 3,182,119

INSULATING GROMMETS

Filed Jan. 3, 1961

INVENTOR.
PHILLIP V. MILLARD
BY
Barnes, Kisselle, Raisch & Choate
ATTORNEYS

United States Patent Office 3,182,119
Patented May 4, 1965

3,182,119
INSULATING GROMMETS
Phillip V. Millard, Detroit, Mich., assignor to Automotive Rubber Co., Inc., Detroit, Mich., a corporation of Michigan
Filed Jan. 3, 1961, Ser. No. 80,444
7 Claims. (Cl. 174—151)

This invention relates to insulating grommets which are used to insulate wires, cables and pipes from a panel through which they are threaded.

In various automotive and aeronautical applications, it is necessary to thread wires, cables or pipes through an opening in a wall or panel. It is desirable and often necessary that these items be insulated electrically from the panel. In addition, because of the great emphasis being placed on sound proofing and moisture proofing, it is desirable that the arrangement be such that sound and moisture will not be transmitted by movement of the wires, cables or pipes relative to the panel. Heretofore, grommets have been made by dipping or pressure molding the resilient materials comprising the grommets about a clip or the like.

It is an object of this invention to provide an insulating grommet which effectively insulates the wire, cable or pipe electrically and acoustically from the panel and which provides a seal preventing the transmission of moisture through the panel.

It is a further object of the invention to provide a novel method and apparatus for forming grommets by casting in an open mold.

Basically, the invention comrpises a body of soft resilient material having a relatively rigid ring embedded therein. The body has an annular contacting surface which is adapted to engage the edge of the opening in the panel to which the grommet is mounted. The ring includes integral fingers or prongs which extend generally axially through the annular contacting surface and are adapted to snap in and engage the periphery of the opening in the panel to hold the grommet in position and, in addition, to compress the material comprising the annular sealing surface around the edge of the opening. The grommet includes one or more axially extending openings through which the wire, cable or pipe is threaded. In one form of the grommet, the body of resilient material seals against the wire, cable or pipe. In another form, axially thickened portions of the grommet surround the wire, cable or pipe. In a still further form, a relatively rigid diaphragm is provided in an opening in the grommet, the diaphragm having means thereon for fixing a wire or cable thereto.

The novel method and apparatus for forming the grommets comprises positioning the ring in an open mold with the prongs extending upwardly, the outer edge of the ring engaging projections or a shoulder in the side wall of the mold thereby holding the ring in spaced relation to the bottom of the mold. A predetermined quantity of an uncured elastomeric composition in liquid form is poured into the mold and the elastomer is cured. When the resultant grommet is removed from the mold it has been accurately formed and the ring is embedded in the interior thereof with the prongs extending outwardly. A preferred type of elastomeric composition comprises what are commonly known as plastisols. Closed cell foamed plastisols are especially suitable for grommets embodying the invention.

Referring to the drawings.

Figure 1:
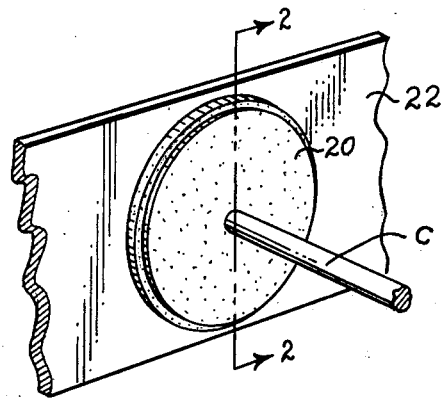
FIG. 1 is a fragmentary perspective view of a grommet embodying the invention shown in position in an opening in a vertical panel.
Figure 2:
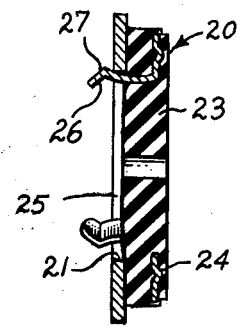
FIG. 2 is a fragmentary sectional view taken along the line 2—2 in FIG. 1.
Figure 3:
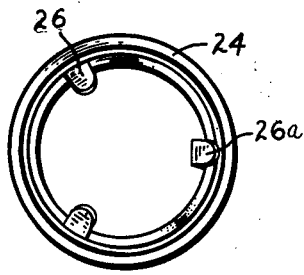
FIG. 3 is a bottom view of a ring which forms part of the grommet embodying the invention.
Figure 4:
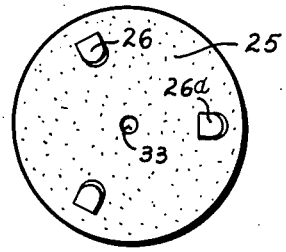
FIG. 4 is a bottom view of the grommet shown in FIGS. 1 and 2 embodying the invention.

Referring to FIG. 1, grommet 20 embodying the invention is adapted to be mounted in an opening 21 of a vertical panel 22. As further shown in FIG. 2, the grommet 20 comprises a generally cylindrical body 23 of soft resilient material such as foamed rubber, foamed plastic or soft dense plastic. Body 23 is of generally uniform axial thickness and a ring 24 is embedded in the body 23. Body 23 thus includes a flat annular surface 25 which is adapted to engage the edge of the opening 21. As shown in the drawings, ring 24 is positioned axially relative to the body 23 near the surface of the body 23 which is remote from surface 25 and includes circumferentially spaced integral fingers 26, 26a, shaped in the form of spring members that are adapted to engage the sides of the opening 21 to hold the grommet in position, compressing the body 23 so that the surface 25 engages the edge of the opening 21. Finger 26a extends outwardly engaging the edge of opening 21. As shown in FIG. 2, each finger 26 includes an outwardly extending portion 27 and the grommet is applied by forcing the fingers axially through the opening, momentarily bending the fingers 26 inwardly so that after they pass through the opening they return to their original position drawing the ring 24 and, in turn, the body 23 axially toward the opening 21 and compressing the portion 25 of the body 23 which contacts the edge of the opening against the opening. The compression and the softness of the material is such that the material is partially deformed into the opening 21.

Figure 5:
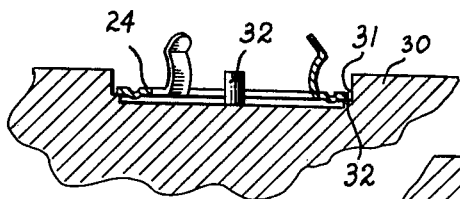
FIG. 5 is a fragmentary sectional view showing the apparatus for forming the grommet of FIGS. 1 to 4.
Figure 6:
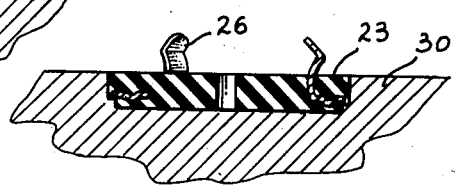
FIG. 6 is a view similar to FIG. 5 showing the grommet after it has been formed.

The grommet 20 is preferably made by foaming or casting the soft resilient material in place about the ring 24. An apparatus for making the grommet is shown in FIG. 5 and comprises a mold 30 which includes an opening 31 having a peripheral shoulder or ledge 32 against which the periphery of the ring 24 rests thereby holding the ring in spaced relationship to the bottom of the opening 31. An insert 32 in mold 31 provides the opening 33 through which the cable C extends. The ring 24 is placed in position with the fingers 26 extending upwardly and the foamed plastic is poured itno the mold to fill the mold as shown in FIG. 6. The plastic is then cured in an oven or at room temperature, if it is of the room temperature curing type, and the grommet is removed from the mold.

Various resilient materials can be used. Foam rubber and foamed plastic are preferred because of their resiliency. Examples of materials which produce satisfactory results and the formulations involved are as follows:

*Example I*

A latex foam sponge composition which produces satisfactory results is of the following composition in parts by weight:

| | |
|---|---|
| 62% de-ammoniated natural latex | 100.0 |
| 20% potassium oleate soap | 1.4 |
| 55% ethyl zimate dispersion | 1.0 |
| 73% sulfur dispersion | 2.0 |
| 65% agerite spar emulsion | 1.0 |
| 50% Zetax dispersion | .25 |
| Foam stabilizer | As required |
| 50% zinc oxide dispersion | 5.0 |
| 20% sodium silicofluoride dispersion | As required |

*Example II*

A vinyl plastic sponge composition producing satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 15–30 |
| Monomeric plasticizers | 75–115 |
| Diluent plasticizers | 5–15 |
| Color | 1.0 |
| Blowing | 1.0 |

*Example III*

A soft dense vinyl material which produces satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 60.0 |
| Monomeric plasticizers | 250.0 |
| Color | 1.0 |

Figure 7:
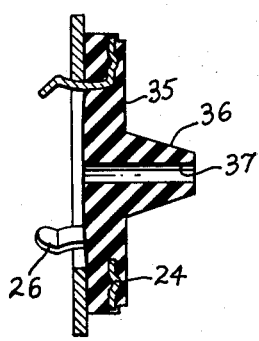
FIG. 7 is a sectional view similar to FIG. 2 of a modified form of grommet.

A modified form of grommet is shown in FIG. 7 wherein the body 35 has a nose or axially extending portion 36 surrounding the opening 37 through which the wire, cable or pipe extend. This form of the invention is particularly useful for use with pipe, rods and the like, which may extend at an angle to the opening through the panel. The nose 36 engages the pipe and provides a good seal between the pipe and the nose.

Figure 8:
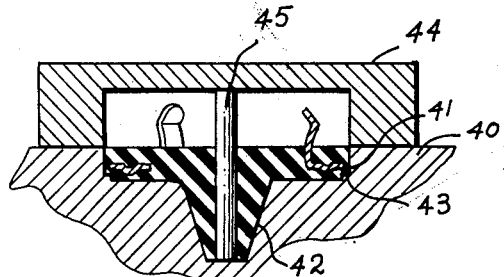
FIG. 8 is a sectional view similar to FIG. 6 showing the apparatus for making the grommet shown in FIG. 7.

The grommet shown in FIG. 7 may be formed in an apparatus such as shown in FIG. 8 which includes a mold 40 having an opening 41 therein including a frusto-conical portion 42. Opening 41 is formed with a peripheral ledge 43 on which the ring 24 is positioned. The mold includes an upper section 44 that has an axially extending pin 45 that is adapted to extend in to the projection 42 to form the opening of the grommet. In making the grommet, the ring 24 is placed in the opening 41, the foaming plastic is poured into the opening and then the section 44 is brought into position forcing the pin 45 downwardly into the projection so that when the foam material is cured the grommet is formed with an opening. After curing, the section 44 is removed and then the grommet can be removed from the mold 40.

Figure 10:
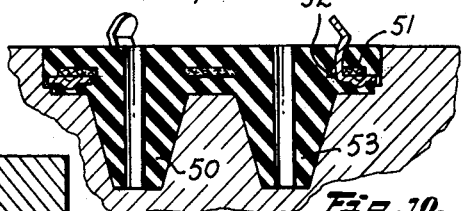
FIG. 10 is a fragmentary sectional view of an apparatus for making the grommet shown in FIG. 9.
Figure 9:
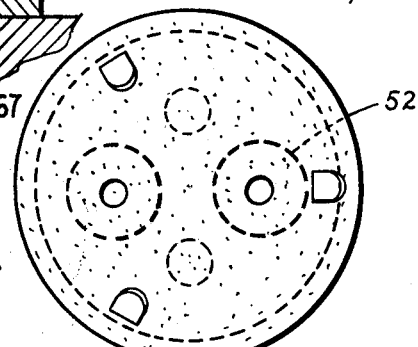
FIG. 9 is a plan view of a still further modified form of grommet.

A further modified form of the invention is shown in FIG. 9 and FIG. 10 wherein in addition to nose sections 50, the grommet includes a reinforcing plate 51 that is placed in position over the ring 23 before casting the grommet. The plate 51 may comprise fiber board, metal or the like and includes opening 52 aligned with the openings 53 of the nose portions 50. The disc or plate 51 operates to give rigidity to the central portion of the grommet.

Figure 12:
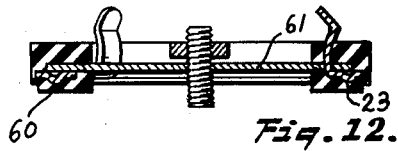
FIG. 12 is a sectional view taken along the line 12—12 in FIG. 11.
Figure 11:
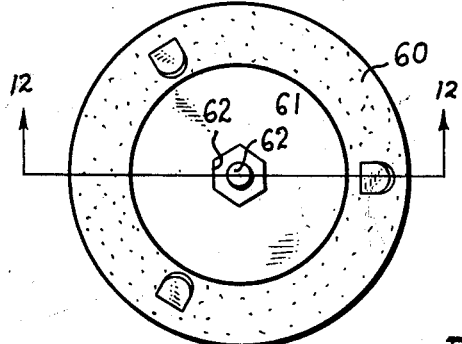
FIG. 11 is a plan view of a further modified form of grommet.

A further modified form of the invention is shown in FIGS. 11 and 12 wherein the grommet 60 is formed with an integral circumferential sheet 61 that is embedded in the grommet. The sheet is formed in such a manner that a bolt 62 can be threaded into the sheet extending through the opening of the body of the grommet thereby providing a mounting for some piece of apparatus on the grommet. For example, a nut 63 can be threaded on the bolt 62.

Figure 13:
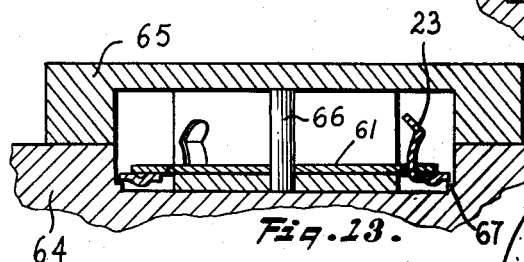
FIG. 13 is a fragmentary sectional view of the apparatus for forming the grommet of FIGS. 11 and 12.

The grommet shown in FIGS. 11 and 12 may be made in an apparatus such as shown in FIG. 13 which includes a mold 64 having an upper section 65 with a downwardly extending pin 66 that extends into the opening in sheet 61. The mold 64 is formed with a shoulder 67 that spaces the ring 23 in the same manner as in the previous forms of the invention.

Figure 14:
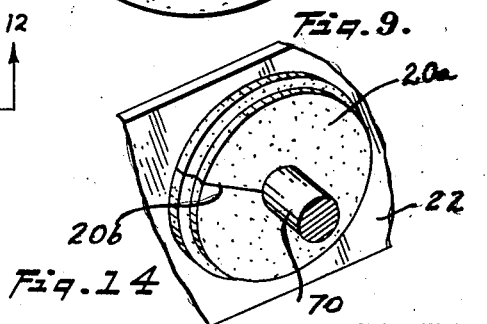
FIG. 14 is a perspective view of a further modified form of grommet.

The form of the invention shown in FIG. 14 comprises a grommet 20a that is identical to that shown in FIGS. 1, 2 and 6 except that the grommet is cut along a radial plane as at 20b so that the grommet can be placed over a wire or rod 70 that is already in position passing through the wall 22. The cut 20b can be made after the grommet is formed by cutting through the body 23 and the ring 24 or, alternatively, the ring 24 can be cut through prior to forming of the grommet and a baffle (not shown) can be used in the molding process so that when the grommet is molded, the slot 20b is formed therein. The slit 20b can lie in a single plane or can be a sinuous or corrugated configuration.

It can thus be seen that I have provided a grommet construction that effectively insulates wires, cables, pipes and the like electrically and acoustically from a panel and in most forms of the invention, further seals and prevents moisture from passing through the panel in which the grommet is mounted.

I claim:

1. In an insulating grommet comprising a body of soft, resilient material including an opening and an annular portion, said annular portion having an annular substantially radial contacting surface extending from said opening to the periphery of said body, said surface lying in a plane which is at a generally right angle to the axis of the opening in said body, said opening in said body having a sealing surface for engaging a member supported by the grommet, and a plurality of resilient fingers embedded in said body and projecting axially outwardly through said contacting surface, at least one of said fingers being shaped in the form of a hook to engage the edge of an opening in a panel, others of said fingers being shaped in the form of spring members and having a portion shaped to resiliently snap by and engage the edge of said opening in a panel to pull said contacting surface of said body axially into sealing engagement with the edge of said opening in said panel.

2. In an insulating grommet comprising a body of soft, resilient material including an opening and an annular portion, said annular portion having an annular substantially radial contacting surface extending from said opening to the periphery of said body, said surface lying in a plane which is at a generally right angle to the axis of the opening in said body, said opening in said body having a sealing surface for engaging a member supported by the grommet, a substantially circular ring embedded in said annular portion in concentric relation thereto spaced radially outwardly from said opening in said body, said ring having a plurality of resilient fingers embedded in said body and projecting axially outwardly through said contacting surface, at least one of said fingers being shaped in the form of a hook to engage the edge of an opening in a panel, others of said fingers being shaped as spring members and having a portion shaped to resiliently snap by and engage the edge of said opening in a panel to pull said contacting surface of said body axially into sealing engagement with the edge of said opening in said panel.

3. The combination set forth in claim 2 wherein said ring is substantially uninterrupted circumferentially.

4. The combination set forth in claim 2 wherein said body is generally cylindrical and has a substantially uniform axial thickness, the major portion of the thickness of said body extending in a direction axially between a plane containing said ring and said radial contacting surface.

5. The combination set forth in claim 2 wherein said body includes an axially extending integral projection surrounding said opening and extending axially away from said contacting surface.

6. The combination set forth in claim 2 including a relatively rigid plate embedded in said body and having an opening therein aligned with said opening in said body.

7. The combination set forth in claim 2 wherein said fingers extend axially from the inner periphery of said ring.

References Cited by the Examiner
UNITED STATES PATENTS

| | | | |
|---|---|---|---|
| Re. 24,438 | 2/58 | Moorhead | 174—153 |
| 58,594 | 10/66 | Burnap | 174—211 X |
| 427,958 | 5/90 | Benwell. | |
| 910,861 | 1/09 | Richards | 174—152 |
| 973,568 | 10/10 | Russell | 339—128 |
| 2,111,713 | 3/38 | Watson. | |
| 2,234,441 | 3/41 | Ludwig | 174—153 |
| 2,926,938 | 3/60 | Ratti | 277—186 |
| 2,942,302 | 6/60 | Beyer | 18—59 |
| 2,955,327 | 10/60 | Beardslee et al. | 18—59 |
| 2,968,498 | 1/61 | Saunders | 277—166 |
| 3,025,716 | 3/62 | Muller | 277—212 X |

JOHN F. BURNS, *Primary Examiner.*

BENNETT G. MILLER, JOHN P. WILDMAN,
*Examiners.*